United States Patent [19]

Millisor

[11] 4,384,008

[45] May 17, 1983

[54] BUTTER-FLAVORED OILS

[75] Inventor: Daniel H. Millisor, Fairfield, Ohio

[73] Assignee: The Procter & Gamble Company, Cincinnati, Ohio

[21] Appl. No.: 240,661

[22] Filed: Mar. 5, 1981

[51] Int. Cl.$^3$ .......................... A23D 5/02; A23L 1/221
[52] U.S. Cl. ..................................... 426/613; 426/103; 426/534
[58] Field of Search ................. 426/98, 103, 533, 580, 426/471, 534

[56] References Cited

U.S. PATENT DOCUMENTS

| | | | |
|---|---|---|---|
| 3,615,702 | 10/1971 | Swisher | 426/98 |
| 3,652,297 | 3/1972 | Peterson et al. | 426/98 |
| 3,653,921 | 4/1972 | Buhler et al. | 426/580 |
| 3,867,556 | 2/1975 | Darragh et al. | 426/98 |
| 3,971,852 | 7/1976 | Brenner et al. | 426/103 |

*Primary Examiner*—Robert A. Yoncoskie
*Attorney, Agent, or Firm*—Rose Ann Dabek; Julius P. Filcik; Richard C. Witte

[57] ABSTRACT

There is disclosed a buttery flavor system for use in shortenings and oils which remains balanced in both aroma and flavor throughout the use cycle. An authentic buttery aroma is perceived in the can by smelling the oil, and an authentic buttery flavor is apparent on tasting the oil. When the flavored oil is heated on the grill and ready for use, during cooking, and in the finished food the aroma and flavor are readily apparent and are recognized as pleasant, authentic butter flavor. The composition is a unique composition of butter flavor components which are used in both an unencapsulated form and encapsulated in a water-soluble material.

10 Claims, No Drawings

BUTTER-FLAVORED OILS

TECHNICAL FIELD

This invention relates to a heat-stable butter flavor which can be used in shortenings, fats and oils.

BACKGROUND OF PRIOR ART

The components of butter flavor are both oil-soluble and water-soluble. In butter or margarine, the water-soluble components are found in the aqueous phase of the emulsion which forms a sink for these materials. They remain soluble in the emulsion and therefore are not volatilized or lost.

Unfortunately, the most common and most important components of artificial butter flavors are diacetyl, butyric and hexanoic acids which are water-soluble and highly volatile. Moreover, in higher concentrations they have a rancid or offensive odor.

When a butter flavor is added to a non-aqueous medium, i.e. a fat or an oil, there is no place for the water-soluble components to be trapped. Because these components have high vapor pressures, they rapidly volatilize and collect in the headspace of the container or above the cooking surface. The concentration of these components is high in the headspace of the container and/or air surrounding the cooking surface, and low in the oil. When the container is opened a rancid butter aroma is perceived. After repeated openings, the volatile portions of the aroma may be lost altogether, leaving an unbalanced butter flavor in the oil.

One of the problems with grilling fats and oils is that the oils are often heated prior to cooking the food. Often this high temperature exposure causes the more highly volatile components to volatilize away from the oil before the food is added. Also, if the shortening or oil is a solid, or a liquid containing solid fat, commercial operations tend to hold a small portion of the fat in a melted state for a period of about three hours for easy handling. This also increases the loss of these key components through volatilization of these materials. This heating also applies to popcorn vending machines wherein the hot buttered oil is used to cook the popcorn and as a popcorn dressing.

There have been various ways proposed to solve this problem. One method added the butyric acid as the sodium salt so that it could not volatilize. The mixture does, however, require buffering. See U.S. Pat. No. 2,527,785, issued to Armstrong in 1950.

Others have solved this problem by totally encapsulating the flavor. The flavor is then released during cooking by the water in the food and by the saliva in the mouth during eating. However, there is no buttery aroma in the can or on the grill.

Surprisingly it has been found that the encapsulation of the non-volatile and volatile components in combination with a minor amount of all the components in an unencapsulated form provides an authentic butter flavor that is balanced in aroma and flavor throughout use—at room temperature in the can, heating prior to usage, during cooking and in the food.

It is an object of this invention therefore to produce a butter-flavored oil which will deliver a balanced butter aroma and eating flavor throughout the use cycle.

It is a further object of this invention to produce a butter-flavored oil in which the aroma and flavor remains authentic during the heating on the grill or in commercial operation.

These and other objects of this invention will become apparent from the detailed description which follows.

SUMMARY OF THE INVENTION

This invention relates to an authentic butter-flavored fat or oil which maintains its buttery flavor and aroma from the can through the food use. The butter-flavored oil comprises 2 portions:
 (A) a major amount of an edible triglyceride;
 (B) a minor but effective amount of a butter flavor composition comprising:
  (1) an encapsulated composition comprising butter flavor components;
  (2) a non-encapsulated composition comprising the ingredients of (1) in an unencapsulated form;
wherein the butter-flavored oil contains no more than 8 ppm of butyric acid, 12 ppm of hexanoic acid, and 12 ppm of diacetyl.

By "encapsulated" herein is meant that the components, either liquid or solid, of the butter flavor are entrapped or encased within an oil-insoluble matrix. Preferably, the encapsulating material is water-soluble.

Butter flavors in general contain butyric acid, lower fatty acids, diacetyl and lactones. However, because of their partial oil-insolubility and high volatility, the butyric acid, hexanoic acid, and diacetyl must be carefully controlled within the oil system to be flavored. These materials have a high threshold of recognition, and have, in general, nauseating and rancid aromas when they are sensed at concentrations higher than normal for buttery flavors. Thus, when formulating a butter-flavored oil, the level of these volatile malodorous components must be strictly controlled, or they must be added in an encapsulated system. Thus, the range of concentration for these materials in an unencapsulated state is critical to the preparation of an authentic butter flavor which will remain balanced throughout the use cycle.

In general, the unencapsulated portion of the flavor should be adjusted so that the finished product contains no more than 8 ppm of butyric acid, 12 ppm of hexanoic acid, and 12 ppm of diacetyl.

The proportions of the flavor components present in the unencapsulated form should be from about 5% to about 90% of flavor components in the encapsulated form, preferably 25% to 90% will be encapsulated.

The most important advantage derived from the encapsulation of the flavor material is that these volatile and malodorous flavor and aroma components are released only when water is added externally. Water provides a vehicle for the release of the flavors as the water-soluble colloidal encapsulating agent and volatile flavor components begin to disperse upon contact with water. A balanced aroma is released during cooking and the food has a balanced flavor and aroma.

The remaining components of the butter flavor system, i.e. the lactones and higher molecular weight acids, and esters, are oil-soluble and thus, do not tend to volatilize and collect in the headspace of the container at room temperature. These materials will volatilize on extended heating. Thus, it has been found that to keep the butter flavor balanced throughout the heating, cooking and food delivery system, some portion of these materials should be encapsulated also. Moreover, for ease of encapsulation, the highly volatile malodorous components are most preferably encapsulated in a separate form from the lesser volatile materials.

As noted above, when the artificial flavor or flavoring components are added to an edible oil, it is essential that the encapsulating material be oil-insoluble, and preferably water-soluble. Water solubility ensures ready release of the flavor components when the encapsulated particles are moistened or dispersed in water. The primary source of water for flavor release is saliva in the mouth. Secondarily, the flavor in the capsules is dissolved by the water in the food being fried, baked, cooked or grilled or otherwise prepared in flavor-enriched fat or oil.

The rate and completeness of flavor release are enhanced, it is believed, by abrasive forces. Physical fracture in mastication contributes to the flavor release.

Encapsulation with materials which undergo a pressure release of the encapsulated material as well as pH and heat release can also be utilized herein.

The preferred encapsulating agents used in this invention are natural gums. The preferred encapsulating gum is dextrin. Dextrin is an intermediate product formed by the hydrolysis of starches. Industrially, it is made by the treatment of various starches with dilute acids or by heating dry starch. The yellow or white powder granules are soluble in water; insoluble in alcohol and ether.

The encapsulating agent-flavorant mixture is generally blended in the proportion of 1 to 200 parts of encapsulating agent to 1 part of flavor components. The preferred ratio is 2 to 60 parts of encapsulating agent to one part of flavorant.

While each of the flavor components can be encapsulated separately, it is preferred that they be encapsulated as two separate mixtures, the volatile components and the non-volatile components. This provides for a more uniform flavor delivery.

Any conventional encapsulating technique can be used. The preferred method utilizes a spray-drying technique to prepare solid particles containing entrapped components of the total flavor or aroma. The volatile and non-volatile components, either alone or mixed, of the flavor are first thoroughly mixed in a water solution of a water-soluble protective coating material such as gelatin, gum arabic, starch or dextrin. This mixture is then sprayed into a column of heated air or gases, which evaporates the water. It is believed that the dry particles resulting from this process comprise a shell or capsule of dry colloid in which the flavoring material is embedded or encapsulated in the form of minute droplets. The flavoring material may also be absorbed into the coating material. This procedure permits the volatile flavor components to be put into a solid, highly water-soluble form which easily lends itself to blending with a wide variety of other ingredients, while also offering protection against evaporation of the volatile components.

The encapsulated and liquid flavor composition can be added to any edible fat or oil, such as plastic shortenings, liquid shortenings, salad oils, vegetable oils, margarine oils and edible triglycerides, in general. The edible fats and oils can be hydrogenated or unhydrogenated, and can contain mixtures of animal and vegetable fats and oils.

Preferably, the flavor components are incorporated into the edible fats or oils at temperatures of from about 50° F. to 150° F. and in quantities within the range of from about 0.001% to 5% based on the edible fat or oil weight. Any suitable method can be used to add the flavor to the edible fat or oil ingredient. When added to plastic shortenings, the total flavor can be conveniently added in conjunction with the plasticizing operation. It is important that sufficient mixing occurs so that the encapsulated particles as well as the other flavor components are uniformly dispersed and suspended in the edible fats or oils.

The mixing and manufacturing procedures are adjusted so that the particle size of the final encapsulated flavoring particle is 420 microns or less. Preferably, the particles will be about 1 to 300 microns in size, more preferably from 25 to 100 microns in size.

The actual preferred particle size will depend upon the type of edible fat or oil used. Larger or smaller particles and more or less dense particles tend to migrate or separate out in liquid shortenings and oils under storage conditions. Particle size in plastic shortenings is not critical, as particle suspension is not a problem under storage conditions.

Other components can also be present in the flavored oils, fats or shortenings. These materials include salts, spices, oleoresins, natural flavorants, and soluble artificial flavorants.

The following Examples illustrate the invention but are not meant to be limiting thereof. All percentages are by weight unless otherwise indicated.

EXAMPLE 1

A butter flavor is prepared as follows:

| Component | Liquid Portion ppm |
|---|---|
| Butyric acid | 1.8 |
| Hexanoic acid | 3.0 |
| Diacetyl | 0.7 |
| Octanoic acid | 5.6 |
| Decanoic acid | 34.5 |
| Dodecanoic acid | 78.1 |
| Delta decalactone | 3.6 |
| Dodecalactone | 8.6 |
| Gamma dodecalactone | 1.1 |
| Component | Capsule A ppm |
| Butyric acid | 19.5 |
| Hexanoic acid | 33.0 |
| Diacetyl | 7.5 |
| Dextrin | 240 |
| Component | Capsule B ppm |
| Octanoic acid | 17 |
| Decanoic acid | 103 |
| Delta decalactone | 10.7 |
| Delta dodecalactone | 26 |
| Gamma dodecalactone | 3.5 |
| Dextrin | 642 |

The liquid portions are mixed together in a standard fashion. The encapsulated materials are mixed together and then encapsulated in dextrin using a standard spray-drying technique. The encapsulated materials and the other flavor components, the liquid portion, are then mixed with partially hydrogenated soybean oil at room temperature in a Hobart mixer. The amount of dextrin in the final flavored oil is 882 ppm (0.088%). The total amount of flavor components in the oil is 350 ppm (.035%). A butter-flavored oil having a pleasant aroma is produced.

When this product is stored at ambient temperatures for a year, the pleasant, authentic butter flavor and aroma are maintained.

When eggs and hashed brown potatoes are fried in the oil prepared in Example 1 they have an excellent authentic buttery taste and are preferred over foods prepared in a commercially available butter-flavored oil in which none of the flavor components are encapsulated.

EXAMPLE 2

A butter-flavored shortening was prepared using the encapsulated systems from Example 1. The shortening contained:

| Ingredient | Percent |
|---|---|
| Hydrogenated soybean oil, I. V. 107 | 96 |
| Hydrogenated vegetable oil, I. V. I-8 | 3.6 |
| Coconut oil | 0.1 |
| Lecithin | 0.1 |
| Unencapsulated flavor | 0.014 |
| Capsule A | 0.03 |
| Capsule B | 0.08 |
| Carotene | 0.004 |

What is claimed is:

1. A butter-flavored fat or oil comprising:
   (A) from about 95% to about 99.9% by weight of an edible triglyceride;
   (B) from about 0.01% to about 5% by weight of a butter flavor composition comprising:
      (1) a butter flavor composition encapsulated in water-soluble material in an amount of about 10-95% based on the weight of the composition;
      (2) the ingredients of the butter flavor of (1) in an unencapsulated form in an amount of about 5-90% based on the weight of the composition wherein the butter-flavored oil contains flavoring amounts but no more than 8 ppm of butyric acid, 12 ppm of hexanoic acid, and 12 ppm of diacetyl.

2. A composition according to claim 1 wherein the unencapsulated composition comprises from about 25% to about 90% of the butter-flavor composition of (B).

3. The process according to claim 2 wherein the encapsulating agent is a natural gum.

4. A composition according to claim 3 wherein the flavor composition is encapsulated in dextrin.

5. A composition according to claim 4 wherein the encapsulated composition comprises:
   (1) an encapsulated composition comprising volatile malodorous butter flavor components selected from the group consisting of butyric acid, hexanoic acid and diacetyl and mixtures thereof; and
   (2) a second encapsulated composition comprising non-volatile components of the butter flavor.

6. A composition according to claim 5 wherein the encapsulated composition consists essentially of:
   (1) encapsulated volatile components comprising butyric acid, hexanoic acid and diacetyl; and
   (2) a second encapsulated flavor composition comprising lactones, higher molecular weight carboxylic acids, and $C_4$-$C_8$ aldehydes.

7. A composition according to claim 6 wherein the second encapsulated composition consists of octanoic acid, decanoic acid, dodecanoic acid, and lactones.

8. A composition according to claim 7 wherein the lactones comprise delta decalactone, delta dodecalactone, and gamma dodecalactone.

9. A composition according to claim 5 wherein the butter flavor composition consists essentially of:
   (1) a volatile composition comprising butyric acid, hexanoic acid, and diacetyl encapsulated in dextrin;
   (2) a non-volatile composition comprising octanoic acid, decanoic acid, delta decalactone, delta dodecalactone, gamma dodecalactone encapsulated in dextrin; and
   (3) an unencapsulated composition comprising butyric acid, hexanoic acid, diacetyl, octanoic acid, decanoic acid, dodecanoic acid, delta decalactone, delta dodecalactone and gamma dodecalatone.

10. A composition according to claim 1 wherein said edible fat or oil is selected from the group consisting of plastic or liquid shortenings, vegetable oil, salad oil, margarine oil, and animal fats or oils.

* * * * *